United States Patent
Clegg et al.

(10) Patent No.: US 8,327,165 B2
(45) Date of Patent: Dec. 4, 2012

(54) SOFT START WITH ACTIVE RESET

(75) Inventors: Joseph Alexander Clegg, Round Rock, TX (US); Mohammed K. Hijazi, Austin, TX (US); Merle J. Wood, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 381 days.

(21) Appl. No.: 12/691,351

(22) Filed: Jan. 21, 2010

(65) Prior Publication Data

US 2011/0179292 A1    Jul. 21, 2011

(51) Int. Cl.
*G06F 1/00* (2006.01)
(52) U.S. Cl. ........................................ 713/300
(58) Field of Classification Search .................... 713/300
See application file for complete search history.

(56) References Cited

U.S. PATENT DOCUMENTS

| | | | |
|---|---|---|---|
| 3,458,796 A | 7/1969 | Cassady | |
| 4,484,307 A * | 11/1984 | Quatse et al. | 705/410 |
| 4,621,313 A | 11/1986 | Kiteley | |
| 4,625,271 A | 11/1986 | Chetty et al. | |
| 5,248,904 A | 9/1993 | Miyazaki et al. | |
| 5,282,125 A | 1/1994 | Dhyanchand et al. | |
| 5,698,973 A * | 12/1997 | Goerke et al. | 323/238 |
| 5,881,251 A | 3/1999 | Fung et al. | |
| 6,377,480 B1 | 4/2002 | Sase et al. | |
| 7,065,658 B1 * | 6/2006 | Baraban et al. | 713/300 |
| 7,129,679 B2 | 10/2006 | Inaba et al. | |
| 7,196,502 B2 * | 3/2007 | Sugiura et al. | 323/274 |
| 2007/0273463 A1* | 11/2007 | Yazdi | 335/78 |

FOREIGN PATENT DOCUMENTS

JP    06161606 A  *  6/1994

* cited by examiner

*Primary Examiner* — Thomas Lee
*Assistant Examiner* — Scott Snyder
(74) *Attorney, Agent, or Firm* — Haynes and Boone, LLP

(57) ABSTRACT

A power supply input circuit includes an input node configured to removeably couple to an electrical source. A solid state switch is coupled between the input node and a capacitive load. An RC soft start circuit is coupled to the input node and the switch. The soft start circuit has a capacitor that causes the switch to increasingly pass electrical power from the source to the load as the capacitor charges from the source. An active reset circuit is coupled to the soft start circuit. The reset circuit is configured to detect when the source is removed from the input node and in response to the source being removed from the input node, the reset circuit discharges the capacitor to reset the soft start circuit.

20 Claims, 3 Drawing Sheets

SOFT START WITH ACTIVE RESET

BACKGROUND

The present disclosure relates generally to information handling systems (IHSs), and more particularly to a soft start circuit with an active reset for an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Traditionally, portable IHSs have been configured to receive electrical power from either an AC power adaptor or a battery. More recently portable IHSs are configured to also receive electrical power from an inductive wireless power/charger devices. Inductive wireless power/charger devices can transfer electrical power to the IHS inductively when in a near proximity to the IHS power receiving circuit. Switching between power sources on the IHS can lead to current spikes on the power rail of the IHS when one source is removed and the other source is applied, which can damage the IHS. To prevent current spikes on the electrical power rail, these IHSs are generally designed to slowly transition between the different power sources, using a soft start power transition circuit. The soft start circuit ramps down power from one power source and ramps up power from the replacement power source, without interrupting power to the IHS.

Soft start circuits are used to limit surge currents to acceptable levels upon application of the voltage to un-energized capacitance banks in the IHS circuit. Examples of application of the voltage is when an energized AC power adapter is plugged into a portable IHS or when the IHS is placed in proximity of an inductive power/charging device, thereby causing the IHS to switch power sources from the battery to the newly connected external power source. In operation, the soft start circuit is to be reset prior to a reapplication of a new power source to the IHS to prevent circuit failure such as an adapter crowbar (e.g., output collapse) or soft start circuit failure. IHSs that are not configured to receive power from an inductive wireless power/charger device typically have an input charging capacitance of only a few hundred micro Farads (uFs). Accordingly, an RC time constant of approximately 10 mS for this type of device is used to slowly bias on a MOSFET switch to switch power sources, which limits the dv/dt. This, in turn, limits the input current inrush accordingly. When the AC power adaptor is removed, the RC time constant is self reset relatively quickly (~10 mS), thus self resetting and becoming ready for reapplication of power by way of the relatively quick bleed-off time for the RC circuit (~10 mS).

However, when using a wireless power/charger device to power the IHS, the IHS requires a significantly larger input bulk capacitance (e.g., ~10,000 uF) on the primary input charging module. As such, this much larger bulk capacitance requires a much longer soft start period (e.g., ~>500 mS) to limit the inrush current to acceptable limits due to the RC time constant for the circuit having the much larger capacitance. A problem with this is that the self reset time for the longer soft start period becomes proportionally much longer as well. With this longer reset time, removal and reapplication of an external power source, such as an AC power adaptor or a wireless power/charging device, can occur before the soft start circuit resets itself. If this happens, an AC adapter crowbar or soft start circuit failure is likely to occur due to an excessive inrush current, which cannot be slowed by the soft start circuit because the soft start circuit is not reset and ready to slowly transition between power sources.

The fast (e.g., ~10 mS) soft start solution described above is simple and low cost and is therefore used for limiting inrush current in many portable IHSs. However, these systems are only well suited where RC time constants are small (e.g., <~10 mS), such as IHSs that are not configured with a high input capacitance for receiving power from a wireless power/charger device. Other solutions, such as, dedicated soft start integrated circuits (ICs) having slew rate control, and current limit are available, however they are significantly more expensive.

Accordingly, it is desirable to provide an improved soft start system having an active reset.

SUMMARY

According to an embodiment, a power supply input circuit includes an input node configured to removeably couple to an electrical source. A solid state switch is coupled between the input node and a capacitive load. An RC soft start circuit is coupled to the input node and the switch. The soft start circuit has a capacitor that causes the switch to increasingly pass electrical power from the source to the load as the capacitor charges from the source. An active reset circuit is coupled to the soft start circuit. The reset circuit is configured to detect when the source is removed from the input node and in response to the source being removed from the input node, the reset circuit discharges the capacitor to reset the soft start circuit.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
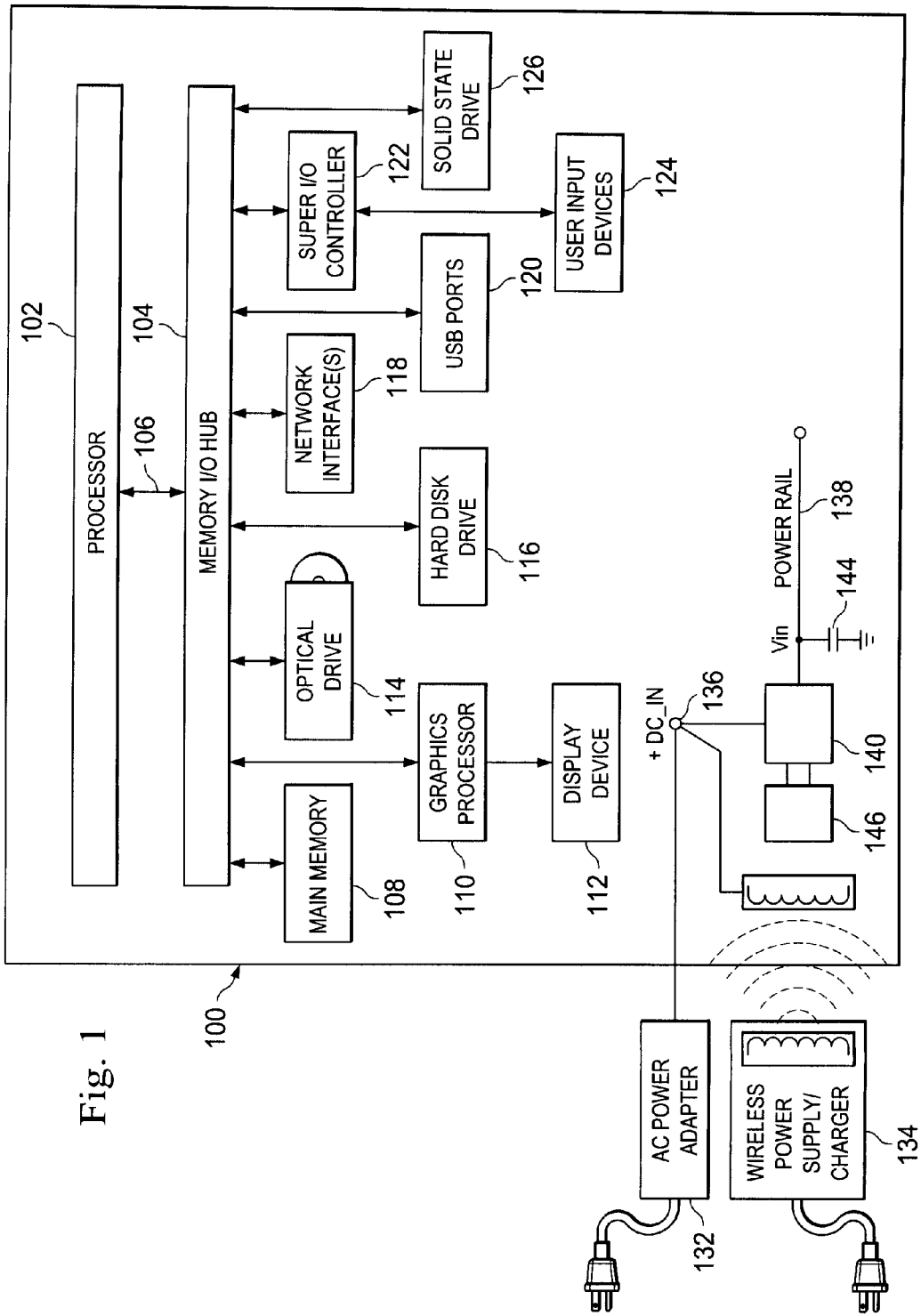
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100. The IHS 100 may include a battery (not shown) that is a DC electrical power source and may be used to power the IHS 100 when the IHS 100 is not connected to an external electrical power source.

FIG. 1 also shows an AC power adaptor/charger 132 coupled to the IHS 100. The power adaptor 132 receives electrical power from an AC power outlet and converts that to a lower voltage DC electrical power and provides the converted power to the IHS 100 for powering the IHS 100 and charging the battery. The power adaptor 132 may be removably coupled to the IHS 100 at a +DCin node 136. This coupling may be performed using a plug on a conductive cable from the adaptor 132 and a mating receptacle on the IHS 100. FIG. 1 also shows a wireless power supply/charger 134 inductively coupled to the IHS 100. In an alternative to having the power adaptor 132 provide electrical power to the IHS 100 via a conductive cable, the wireless power supply 134 may provide electrical power to the IHS 100 via inductive coupling with the IHS 100. As should be readily understood, this type of coupling is similar to that used for inductive coupling in transformers. For example, an inductive "winding" portion may be provided in the wireless power supply 134 to radiate power received by the wireless power supply 134 from an AC power source. Additionally, an inductive "winding" portion may be provided in the IHS 100 to receive the power radiated by the wireless power supply 134 and to convert it to a DC power for use by the IHS 100. The receiving "winding" portion in the IHS 100 is coupled to the +DCin node 136 to provide the power to the IHS 100. Embodiments of the IHS 100 capable of inductively coupling with the wireless power supply 134 may include a very high input capacitance, such as an approximately 10,000 uF (micro Farad) capacitance.

The IHS 100 may include a priority for selecting available power supplies for powering the IHS 100. For example, the IHS 100 may select one of the external power supplies (e.g., the power adaptor 132 or the wireless power supply 134) when available to provide power to the IHS 100 instead of using the battery. However, if there are no external power supplies available, the IHS 100 may then power the IHS 100 using the battery. Thus, as different power supplies become available for the IHS 100, the IHS can transition between the available power supplies according to the priority of the available power supplies. For example, the IHS 100 may switch between the wireless power supply 134 and the battery for powering the IHS 100 as the IHS 100 is moved in and out of inductive coupling proximity of the wireless power supply 134.

To reduce power spikes on an IHS Vin node/power rail 138 during transitions between power supply sources, a soft start circuit 140 ramps down power from the first power source (e.g., the battery) and at the same time ramps up power from the newly connected power source (e.g., the power adaptor 132 or the wireless power supply 134) to provide a relatively flat/smooth power transition on the power rail 138 to power the IHS 100 without spiking power too high and without resetting the IHS 100. The soft start circuit 140 is an RC type circuit that charges a capacitor in the circuit 140 that increasingly powers on a solid state switch to ramp up power from the newly coupled power source (e.g., the power adaptor 132 or the wireless power supply 134). The soft start circuit 140 is described in more detail below. An input capacitance 144 may also be provided at the power rail 138. In an embodiment, the capacitance 144 is approximately 10,000 uF. However, other values of capacitance may be used with the IHS 100. When using high values of capacitance (e.g., ~10,000 uF), the capacitor for the RC soft start circuit 140 must accordingly be large (e.g., ~47 uF). Such a large capacitance value causes the soft start circuit 140 to charge the capacitor in the RC circuit slowly (e.g., ~>500 mS (milliseconds)). As such, when the newly coupled power supply (e.g., the power adaptor 132 or the wireless power supply 134) is removed, the capacitor for the RC circuit of the soft start circuit 140 will discharge through the resistor of the RC circuit to reset the soft start circuit 140 to be ready to soft start the next power supply, when it is coupled to the IHS 100. This reset time (e.g., ~>500 mS) using the large value capacitor (e.g., ~47 uF) is too long of a time period to adequately protect the power rail 138. Therefore, an active reset circuit 146 is coupled to the soft start circuit 140 to detect when the input source power supply (e.g., the power adaptor 132 or the wireless power supply 134) is uncoupled from the IHS 100 and then the reset circuit 146 quickly (e.g., ~<30 mS) discharges the capacitor of the RC circuit to reset the soft start circuit 140. The active reset circuit 146 is described in more detail below.

In other words, the present disclosure provides an IHS 100 having a reset circuit 146 to a soft start circuit 140 that performs two functions: (1) determines when an electrical input source power (e.g., the power adaptor 132 or the wireless power supply 134) has been removed from IHS 100; and (2) resets the soft start circuit 140 when the input source (e.g., the power adaptor 132 or the wireless power supply 134) has been removed from the +DCin node 136. The reset circuit 146 detects when the input voltage level drops to a predetermined level, at which time the soft start RC time constant is reset by collapsing the voltage across the "C" capacitor of the RC circuit. The soft start circuit 140 can be reset via this reset circuit 146 within milliseconds, while the soft start circuit 140 self-reset time may be in the seconds time range. As is explained in more detail below, a comparator device compares the input voltage at +DCin 136 to a reference voltage. When the input voltage drops below the reference voltage (e.g., dc input power is removed), a first transistor in the reset circuit 146 is biased, thereby turning on a second transistor in the reset circuit 146. This second transistor is coupled to the "C" capacitor of the RC circuit in the soft start circuit 140. Accordingly, this, in turn, collapses the voltage across the "C" capacitor in the soft start circuit 140, thereby resetting the soft start circuit 140.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
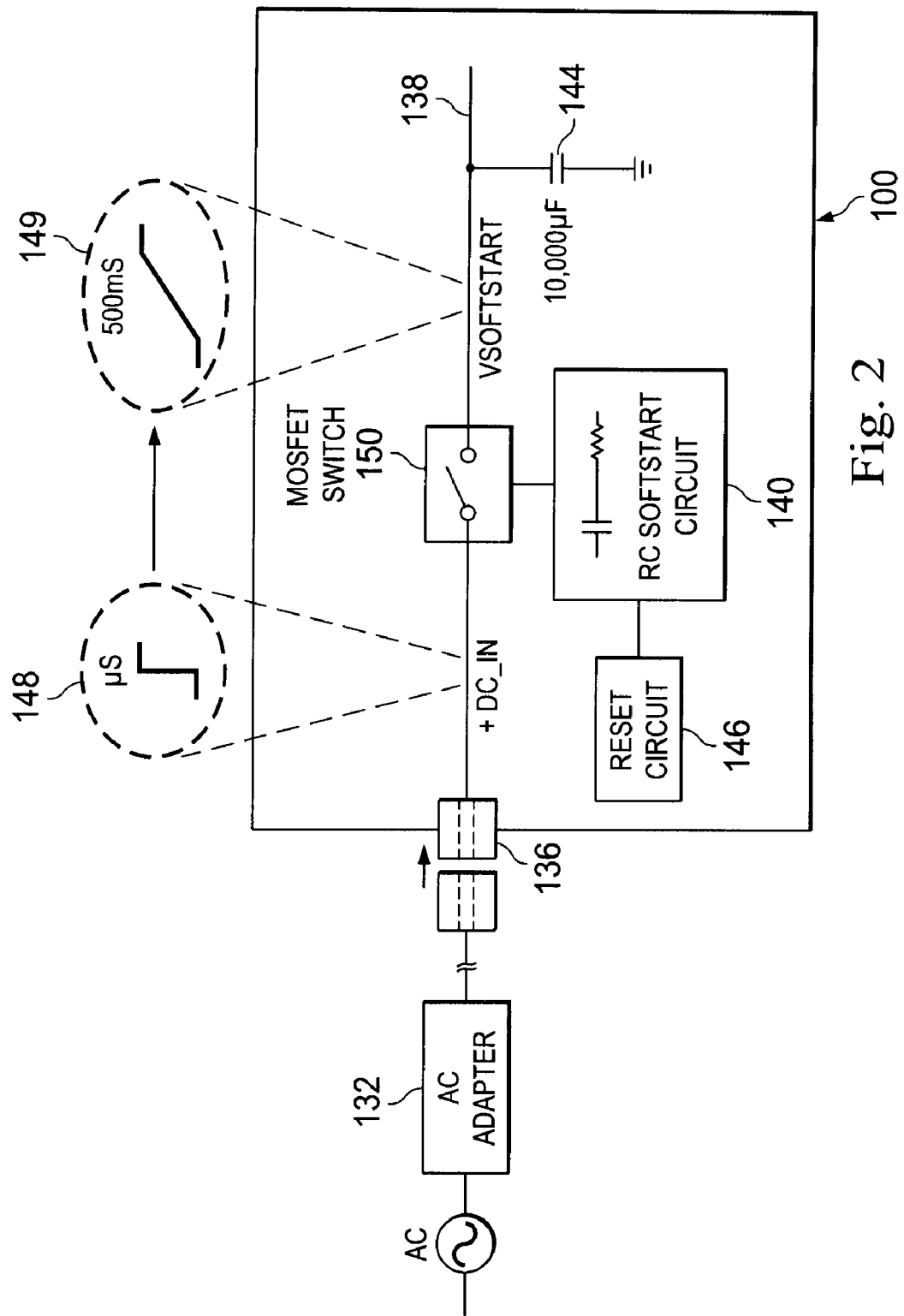
FIG. 2 illustrates a block diagram of an embodiment of a soft start circuit having an active reset for use with the IHS of FIG. 1.

FIG. 2 illustrates a block diagram of an embodiment of a portion of the IHS 100 including the soft start circuit 140, the active reset circuit 146 and a solid state soft start switch 150 coupled between the +DCin node 136 and the power rail 138. The soft start circuit 140 includes an RC circuit that ramps on the switch 150 to prevent a power spike or collapse when changing between power supplies (e.g., coupling/decoupling the power adaptor 132 or the wireless power supply 134 and transitioning to and from the battery). An example input voltage spike for the +DCin node 136 is shown in the graph 148. This may be a result of the power adaptor 132 or the wireless power supply charger 134 electrically coupling to the +DCin node 136 of the IHS 100. Accordingly, at the initial coupling, the voltage spikes up very quickly, such as within a few microseconds (uS). Using the soft start circuit 140 to transition the change in power sources by ramping on the switch 150 over time, the transition on the power rail 138 is much slower, such as approximately 500 milliseconds (mS). A benefit of this is that it reduces very fast power spikes on the power rail 138, which can damage components of the IHS 100. The solid state switch 150 is a MOSFET type device. However, other types of solid state devices may be used for the switch 150. The switch 150 should be sized to handle a power load according to power usage on the power rail 138. When the external power supply (e.g., the power adaptor 132 or the wireless power supply 134) is uncoupled from the +DCin node 136, the reset circuit 146 quickly discharges the "C" capacitor in the RC soft start circuit 140 to reset the soft start circuit 140 so that it is ready for use again.

Figure 3:
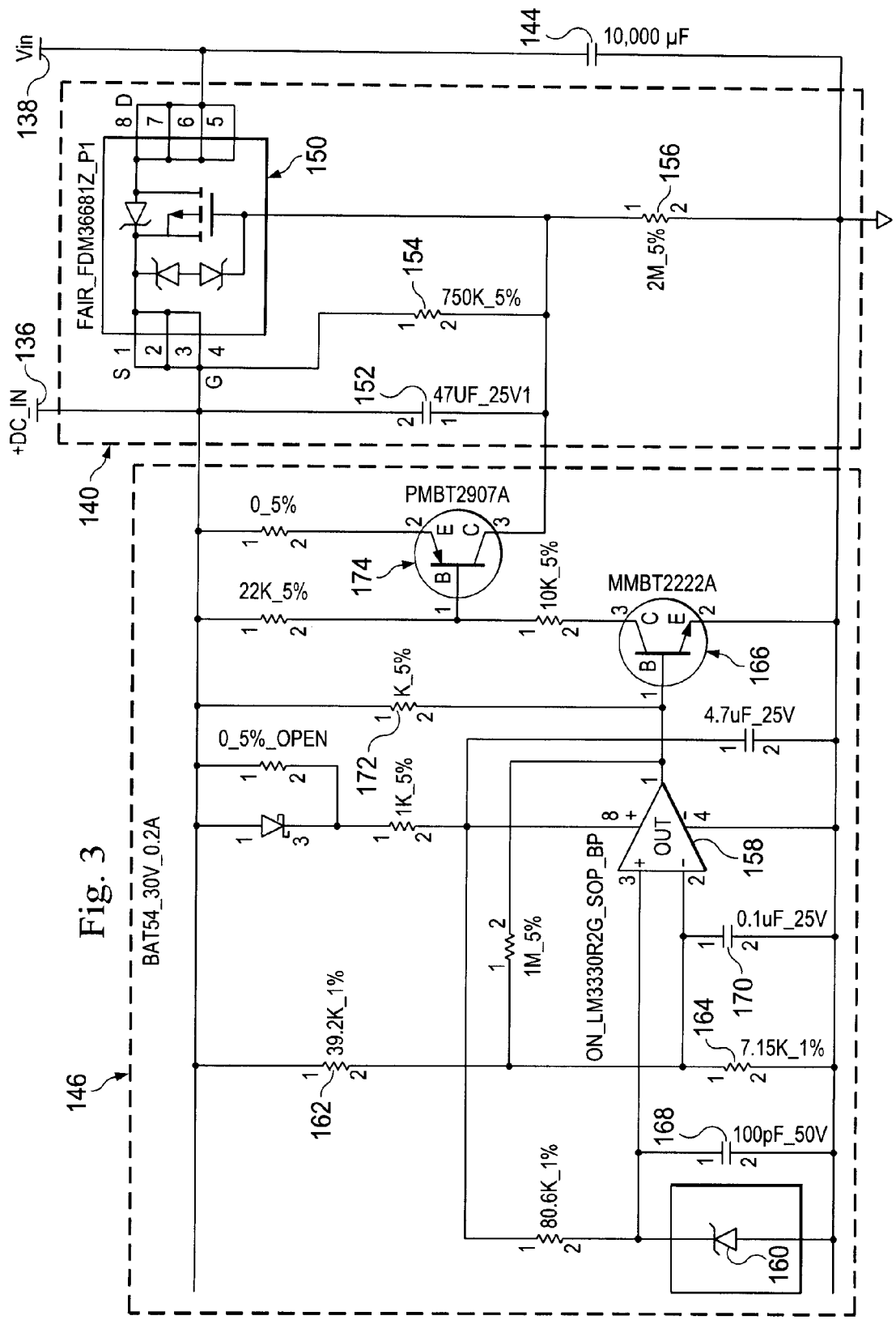
FIG. 3 illustrates a schematic diagram of the soft start circuit of FIG. 2.

FIG. 3 illustrates a schematic diagram of the soft start circuit 140 coupled to the active reset circuit 146. As shown, the reset circuit 140 includes the switch 150 coupled between the power rail 138 and a capacitor 152 (e.g., the "C" capacitor in the RC circuit), a first resistor 154 (e.g., the "R" resistor in the RC circuit), and a second resistor 156. The solid state switch 150 (e.g., a MOSFET switch) is to be sized to handle peak and average current requirements of the IHS 100. The reset circuit 146 includes a comparator device 158, a diode 160, resistors 162 and 164, a first transistor 166, capacitors 168 and 170, resistor 172, and transistor 174. Operation of these components is described below. Operation of other components shown in FIG. 3 should be readily understood by those having ordinary skill in the art.

In operation, the RC circuit of resistor 154 and capacitor 152 cause the switch 150 to be turned on slowly after an external power source (e.g., the power adaptor 132 or the wireless power supply 134) is coupled to the +DC in node 136. Ramping on the switch 150 allows Vin on the power rail 138 to slowly rise. This limits an inrush current to the load capacitor 144. In an embodiment where the load capacitor 144 is approximately 10,000 uF, the time for the voltage to raise to it's full value, may be approximately 500 mS or more. However, other time periods are acceptable.

Initially switch 150 is off, not passing any power from the +DCin node 136 to the power rail 138. Then, when a source voltage is applied to the +DCin node 136, the capacitor 152 is slowly charged through the resistor 156. Accordingly, the charging of the capacitor 152 causes the ramping on/slow turn-on of the switch 150, ramping up the power passing through the switch 150 from the +DCin node 136 to the power rail 138. Ramping up the power through the switch 150 limits inrush current to the power rail 138.

Upon interruption of power at the +DCin node 136, such as by either by disconnecting the power adaptor 132 or the wireless power supply 134 or by a momentary dropout of power, the capacitor 152 is discharged through the resistor 154. This resets the soft start circuit 140 for a next application of power at the +DCin node 136, such as by re-coupling the power adaptor 132 or wireless power supply 134. In embodiments of IHS having small values for capacitor 152 (e.g., ~0.1 uF) this discharge time is quick enough to reset the soft start circuit 140 before power can typically be reapplied to the +DCin node 136. However in cases where capacitor 152 is large (e.g., ~>1 uF) it becomes possible that input power at the +DCin node 136 can be interrupted and reapplied before the capacitor 152 discharges and resets the soft start circuit 140. As such, in this case excessive current can flow into the load capacitance 144. This condition may cause connector arcing and or input power source over current shutdown, or a variety of other conditions. Due to this, the capacitor 152 is actively reset using the reset circuit 146 when the IHS 100 has a large input capacitance (e.g., ~10,000 uF).

In operation of the reset circuit 146, a comparator circuit (e.g., comparator 158) determines when power is removed or interrupted from the +DCin node 136. The comparator 158 "−" pin (e.g., pin 2) compares voltage at the "−" pin to a reference voltage provided to the comparator "+" pin (e.g., pin 3). A resistor divider formed by resistors 162 and 164 precisely sets the input voltage at the comparator "−" pin. In normal operation where the +DCin node 136 voltage is fully up, the comparator "−" pin voltage potential is greater than the comparator "+" pin voltage potential. Having this condition, comparator 158 output pin (e.g., pin 1) has a low impedance value (e.g., ~0V), thereby not allowing current to flow into transistor 166. Capacitors 168 and 170 provide a time delay, as needed, during an IHS 100 power up sequence and also during an IHS 100 power down sequence. In addition, capacitors 168 and 170 provide circuit noise filtering during steady state circuit operation.

When power is removed from the +DCin node 136, the voltage at the +DCin node 136 begins to fall. The falling voltage at the +DCin node 136 causes the voltage value at the comparator "−" pin to fall proportionally. Then, when the voltage at the comparator "−" pin becomes less than the voltage at the comparator "+" pin, the comparator 158 output pin becomes a high impedance and allows resistor 172 to bias on transistor 166. When transistor 166 is biased on, current is drawn through a circuit path including resistor 172 and transistor 174 pins E and B. This current flow biases the transistor 174 to an on state. When transistor 174 is biased on, the capacitor 152 is rapidly discharged. Accordingly, this resets the soft start circuit 140 when a drop in voltage at the +DCin node 136 is detected. As should be understood, an embodiment of the present disclosure provides that the circuit reset function provided herein may be performed using the soft start circuit 140 and the active reset circuit 146 resulting in a reset time of less than 30 mS from when voltage is removed from the +DCin node 136, whereas the self-reset time for the soft start circuit 140 alone may be approximately ~500 ms or more. It is noted that the reset time for the circuit 140 should be greater than about 16 mS to avoid resetting the IHS 100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power supply input circuit comprising:
    an input node configured to removeably couple to a plurality of electrical power sources including a wireless electrical power source;
    a solid state switch coupled between the input node and a capacitive load that is coupled to a power rail, wherein the capacitive load is sized to permit the wireless electrical power source to power a load coupled to the power rail;
    an RC soft start circuit coupled to the solid state switch, the RC soft start circuit having a capacitor that causes the solid state switch to increasingly pass electrical power from one of the plurality of the electrical power sources to the capacitive load as the capacitor charges from the one of the plurality of the electrical power sources; and
    an active reset circuit coupled to the RC soft start circuit, the active reset circuit configured to detect when the one of the plurality of the electrical power sources is decoupled from the input node and, in response, discharges the capacitor to actively reset the soft start circuit.

2. The power supply input circuit of claim 1, wherein the capacitive load is sized at approximately 10,000 micro Farads.

3. The power supply input circuit of claim 2, wherein the plurality of electrical power sources includes a battery electrical power source and a wired electrical power source.

4. The power supply input circuit of claim 1, wherein the capacitor is discharged in less than 30 milliseconds using the active reset circuit.

5. The power supply input circuit of claim 1, wherein the active reset circuit includes a transistor that passes charge from the capacitor to discharge the capacitor.

6. The power supply input circuit of claim 5, wherein a comparator device drives the transistor.

7. The power supply input circuit of claim 1, wherein the solid state switch is a MOSFET solid state switch.

8. An information handling system (IHS) comprising:
    a processor;
    a memory device coupled to the processor; and
    a power supply input circuit coupled to the processor and the memory device, the power supply input circuit comprising:
        an input node configured to removeably couple to a plurality of electrical power sources including a wireless electrical power source;
        a solid state switch coupled between the input node and a capacitive load that is coupled to the processor and the memory device, wherein the capacitive load is sized to permit the wireless electrical power source to power the processor and the memory device;
        an RC soft start circuit coupled to the solid state switch, the RC soft start circuit having a capacitor that causes the solid state switch to increasingly pass electrical power from one of the plurality of the electrical power sources to the capacitive load as the capacitor charges from the one of the plurality of the electrical power sources; and
        an active reset circuit coupled to the RC soft start circuit, the active reset circuit configured to detect when the one of the plurality of the electrical power sources is decoupled from the input node and, in response, discharges the capacitor to actively reset the soft start circuit.

9. The IHS of claim 8, wherein the capacitive load is sized at approximately 10,000 micro Farads.

10. The IHS of claim 9, wherein the plurality of electrical sources includes a battery electrical power source and a wired electrical power source.

11. The IHS of claim 8, wherein the capacitor is discharged in less than 30 milliseconds using the active reset circuit.

12. The IHS of claim 8, wherein the active reset circuit includes a transistor that passes charge from the capacitor to discharge the capacitor.

13. The IHS of claim 12, wherein a comparator device drives the transistor.

14. The IHS of claim 8, wherein the solid state switch is a MOSFET solid state switch.

15. A method comprising:
    providing a solid state switch between an input node and a capacitive load that is coupled to a power rail, wherein the capacitive load is sized to permit a wireless electrical power source to power a load coupled to the power rail;
    receiving power by an RC soft start circuit from one of a plurality of electrical power sources coupled to the input node, wherein the RC soft start circuit causes the switch to increasingly pass power from the one of the plurality of electrical power sources to the capacitive load; and
    detecting when the one of the plurality of electrical power sources is decoupled from the input node and, in response, actively resetting the RC soft start circuit.

16. The method of claim 15,
    wherein the capacitive load is sized at approximately 10,000 micro Farads.

17. The method of claim 16,
    wherein the plurality of electrical power sources to include a battery electrical power source and a wired electrical power source.

18. The method of claim 15, wherein the actively resetting the RC soft start circuit is performed in less than 30 milliseconds.

19. The method of claim 15,
    wherein the actively resetting the RC soft start circuit includes discharging a capacitor in the RC soft start circuit using a transistor.

20. The method of claim 19, further comprising:
    driving the transistor using a comparator device.

* * * * *